(12) United States Patent
Liu et al.

(10) Patent No.: US 12,147,742 B2
(45) Date of Patent: Nov. 19, 2024

(54) METHOD FOR NUMERICAL RECONSTRUCTION AND HEAT TRANSFER CHARACTERISTICS EVALUATION OF MICROSTRUCTURE OF THERMAL BARRIER COATINGS CONTAINING MICROCRACKS

(71) Applicant: University of Science and Technology Beijing, Beijing (CN)

(72) Inventors: Ningning Liu, Beijing (CN); Linjing Huang, Beijing (CN); Ruifeng Dou, Beijing (CN); Mengqi Yu, Beijing (CN); Linxi Zhang, Beijing (CN); Zhi Wen, Beijing (CN); Xunliang Liu, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 18/373,298

(22) Filed: Sep. 27, 2023

(65) Prior Publication Data

US 2024/0135057 A1    Apr. 25, 2024

(30) Foreign Application Priority Data

Oct. 17, 2022    (CN) .......................... 202211264771.2

(51) Int. Cl.
G06F 30/20      (2020.01)
G06F 111/08     (2020.01)
G06F 111/10     (2020.01)

(52) U.S. Cl.
CPC .......... G06F 30/20 (2020.01); *G06F 2111/08* (2020.01); *G06F 2111/10* (2020.01)

(58) Field of Classification Search
CPC ... G06F 30/20; G06F 2111/08; G06F 2111/10
See application file for complete search history.

(56) References Cited

U.S. PATENT DOCUMENTS

2003/0100242 A1    5/2003    Annigeri et al.

FOREIGN PATENT DOCUMENTS

| CN | 110222396 A | 9/2019 |
| CN | 111751403 A | 10/2020 |
| CN | 113744270 A | 12/2021 |

OTHER PUBLICATIONS

Wang Y, Liu H, Ling X, Weng Y. Effects of pore microstructure on the effective thermal conductivity of thermal barrier coatings. Applied Thermal Engineering. Jun. 5, 2016;102:234-42. (Year: 2016).*

(Continued)

*Primary Examiner* — Chuen-Meei Gan
(74) *Attorney, Agent, or Firm* — Bayramoglu Law Offices LLC (57) ABSTRACT

A method for numerical reconstruction and heat transfer characteristics evaluation of a microstructure of thermal barrier coatings containing microcracks includes the following steps: determining a simulation area and size settings, generating random microcracks with different morphological characteristics and placing the microcracks in the simulation area, and determining whether a space occupied by the microcracks reaches a porosity ratio of the preset microcracks, building a general pore model of thermal barrier coatings (TBCs) based on the QSGS method, reconstructing true mesoscopic morphologies of the TBCs, determining whether the preset volume fraction has been reached, and building a heat transfer analysis model based on the thermal Lattice Boltzmann method to calculate heat insulation performance parameters such as temperature distribution, and thermal conductivity. Compared with the prior art, the heat (Continued)

transfer analysis model can restore a mesoscopic structure of the coating more truly and effectively.

3 Claims, 8 Drawing Sheets

(56) References Cited

OTHER PUBLICATIONS

Koushali AG, Sameezadeh M, Vaseghi M, Safarpour P. Modeling and simulation of thermal fatigue crack in EB-PVD TBCs under non-uniform temperature. Ceramics International. Nov. 1, 2017;43(16):13140-5. (Year: 2017).*

Song J, Qi H, Shi D, Yang X, Li S. Effect of non-uniform growth of TGO layer on cracking behaviors in thermal barrier coatings: A numerical study. Surface and Coatings Technology. Jul. 25, 2019;370:113-24. (Year: 2019).*

Zhe Lu, Min-Sik Ki, Myoung SW, Je-Hyun Le, Yeon-Gil Ju, In-Soo Ki, Chang-Yong Jo. Thermal stability and mechanical properties of thick thermal barrier coatings with vertical type cracks. Transactions of Nonferrous Metals Society of China. Jul. 1, 2014;24:s29-35. (Year: 2014).*

Li Jia-Li, Numerical Study of the Thermal Insulation of 8YSZ TBCS and Conjugate Heat Transfer Between TBCS and Cooling Film, Dissertation Submitted to Shanghai Jiao Tong University for the Degree of Master, 2016, pp. 1-78.

Hao Hongliang, et al., Insulation Property Evolution of Thermal Barrier Coatings During High Temperature Services, Journal of Chinese Society of Power Engineering, 2020, pp. 671-677, 685, vol. 40, No. 8.

Jinqi Zhu, et al., Heat transfer of multi-slot nozzles air jet impingement with different Reynolds number, Applied Thermal Engineering, 2021, pp. 1-13, vol. 186, 116470.

* cited by examiner

METHOD FOR NUMERICAL RECONSTRUCTION AND HEAT TRANSFER CHARACTERISTICS EVALUATION OF MICROSTRUCTURE OF THERMAL BARRIER COATINGS CONTAINING MICROCRACKS

CROSS REFERENCE TO THE RELATED APPLICATIONS

This application is based upon and claims priority to Chinese Patent Application No. 202211264771.2, filed on Oct. 17, 2022, the entire contents of which are incorporated herein by reference.

TECHNICAL FIELD

The present disclosure relates to the technical field of porous media, and in particular to a method for numerical reconstruction and heat transfer characteristics evaluation of a microstructure of thermal barrier coatings containing microcracks.

BACKGROUND

In order to make turbine blades have a long service life and high reliability, thermal barrier coatings (TBCs) need to be applied onto surfaces of the turbine blades of high-performance aircraft engine. The technology of TBCs has bright application prospects in the fields of aerospace, weapons, ships, and the like. TBCs made of ceramic materials have the characteristics of high temperature resistance, corrosion resistance, high strength, low thermal conductivity, and the like, and heat insulation effects generated by the TBCs directly affect the service life and running reliability of an engine. A system with TBCs is generally composed of a three-layer structure, that is, a ceramic layer, a bonding layer, and a superalloy substrate. Specifically, the bonding layer mainly adopts MCrAlY alloy (M refers to Fe, Ni, Co, and the like). Because the bonding layer is subjected to thermal cycle oxidation for a long time in the service process, when Al content is consumed to the extent that $Al_2O_3$ growth cannot be satisfied, a thermally grown oxide will be formed on the interface between the ceramic layer and a transition layer, such that a center of microcrack initiation is formed. The initiation and further expansion of microcracks will produce stress concentration, which will greatly change the temperature distribution of the coating, thereby affecting the thermal insulation performance, service efficiency and durability of the coating.

Because microcracks on the TBCs do not have obvious regularity, some scholars establish ideal models to analyze the impact of microcracks on temperature distribution characteristics and heat insulation performance of the TBCs by chiefly simplifying a microstructure of the coating. However, the existing research focuses on presetting microcracks of single composition, which directly simplifies the microcracks into spheres, ellipsoids or sheets in the same length, direction or size. However, in reality, the TBCs contain microcracks randomly distributed in different sizes, inclinations, numbers, positions and morphologies. Such oversimplified hypothesis models deviate greatly from the actual situation, and calculation results generated therefrom are not universal and applicable.

SUMMARY

Aiming at defects in the prior art, the present disclosure provides a method for numerical reconstruction and heat transfer characteristics evaluation of a microstructure of thermal barrier coatings containing microcracks, so as to solve the technical problem that a simplified model of the pore structure of thermal barrier coatings (TBCs) containing microcracks deviates greatly from a real coating structure.

In order to achieve the above objective, the present disclosure adopts the following technical solution:

a method for numerical reconstruction and heat transfer characteristics evaluation of a microstructure of thermal barrier coatings containing microcracks, including:

S1: determining a simulation area and size settings, including settings of a physical model and a simulation calculation grid; and generating random microcracks with different morphological characteristics based on the Monte Carlo simulation method and the quartet structure generation set (QSGS) method.

S2: changing the inclination directions of different microcracks by the coordinate transformation method according to a certain statistical law and placing them in the simulation area, and determining whether a space occupied by the microcracks reaches a porosity ratio of the preset microcracks.

S3: building a general pore model of thermal barrier coatings (TBCs) based on the QSGS method, where a solid skeleton in the TBCs is taken as a growth phase, pores are non-growth phases, the porosity is defined to control a pore volume fraction of the coating, and the generation probability of a nucleation center of the solid skeleton is defined to control the number of the pores; traversing the initially randomly distributed growth nucleus nodes, making each growth nucleus node randomly grow in a three-dimensional space, controlling the generation of the TBCs with different structures according to the growth probabilities of growth nucleus in 26 directions under three-dimensional coordinates, where the growth probability of the growth nucleus of the lamellar structure coating in the horizontal direction is far greater than that of the columnar structure coating, while the columnar structure coating is opposite.

S4: superposing a general pore structure into the simulation area containing microcracks to generate a coating pore model coupled with microcrack detects, reconstructing true mesoscopic morphologies of the TBCs, and determining whether the preset volume fraction has been reached.

S5: building a heat transfer analysis model based on the thermal Lattice Boltzmann method to calculate heat insulation performance parameters such as temperature distribution, and thermal conductivity.

It should be noted that the Monte Carlo simulation method is adopted in the step S1 to generate a microcrack morphology under a certain statistical distribution law:

S1.1 Generating random numbers uniformly distributed over an interval of [0,1]:

an iterative formula of the linear congruential method for generating the random numbers is:

$$x_n = (ax_{n-1} + c)(\bmod M)$$

where a is a non-negative multiplier; c is a non-negative increment; M is a modulus; and (mod M) represents a remainder after being divided by m.

further, generating random numbers R uniformly distributed over the interval of [0,1]:

$$R_i = \frac{x_i}{M}$$

S1.2 Using uniform random number calculation to generate random numbers with other specified statistical distribution law:

The uniform random numbers over the interval of [0,1] generated in the (1) above are used to generate random numbers that obey other distribution types.

For example, the probability density function of a uniform distribution is:

$$f(x) = \frac{1}{b-a} (a \leq x \leq b)$$

A method for calculating random variables is as follows:

$$x_f = (b-a)R + a$$

in the formula, $x_f$ is random numbers required; and R represents random numbers uniformly distributed over the interval [0,1].

S1.3 Carrying out translation and rotational transformation of coordinates to realize changes in the orientation of microcracks:

There are a base coordinate system 0 and a moving coordinate system I, their postures are the same, and their origins are not coincident. For any particle P in a space that is fixedly connected to the coordinate system I, its coordinates in the coordinate system 0 are expressed as $P_0 = [p_{0x}\ p_{0y}\ p_{0z}]^T$, and in the coordinate system I are expressed as $P_1 = [p_{1x}\ p_{1y}\ p_{1z}]^T$, and coordinates of the origin $O_1$ of the coordinate system I are $D_0^1 = [d_{0x}\ d_{0y}\ d_{0z}]^T$; there exists $P_0 = P_1 + D_0^1$ according to the rules for vector operations; when an attitude change matrix of the coordinate system I relative to the coordinate system 0 is taken into account, relative relationship between them can be considered as a combination of translational motion between the origins and pure rotation around the origins, there exists $P_0 = Rot_0^1 P_1 + D_0^1$; similarly $P_1 = Rot_1^0 P_0 + D_1^0$; where Rot represents basic rotation, which is written in a matrix in three-dimensional coordinates in the form of:

$$Rot_{x,\alpha} = \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix}$$

$$Rot_{y,\phi} = \begin{bmatrix} \cos\phi & 0 & \sin\phi & 0 \\ 0 & 1 & 0 & 0 \\ -\sin\phi & 0 & \cos\phi & 0 \\ 0 & 0 & 0 & 1 \end{bmatrix}$$

$$Rot_{z,\theta} = \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix}$$

The above formulae identify rotation by angles $\alpha$, $\phi$ and $\theta$ around x, y and z axes, respectively.

S1.4 Generating microcracks, and using the QSGS method to control the growth probability in the length/width direction to 100/1 to ensure that the microcracks are wedge-shaped; controlling the thickness direction of a single microcrack to be two layers of grids, so as to ensure that the microcrack is approximately a lamellar structure; and using the Monte Carlo simulation method to generate such morphology parameters as nucleation center point $(x_0, y_0, z_0)$, inclination angle $\varphi$, inclination angle $\theta$, length, and the number according to a certain statistical distribution law. The nucleation center point (x0, y0, z0) serves as a growth nucleation center of microcracks under QSGS method, the length of the microcracks controls the growth probabilities of the microcracks in different directions, and the inclination angle $\varphi$ and the inclination angle $\theta$ serve as bases for rotational transformation of coordinates, such that microcracks with different shapes, sizes, directions, and the like, distributed according to a certain statistical law are generated.

It should be noted that the algorithm in the step S3 is a circular traversal of the initial growth nucleus nodes and the growth nucleus nodes after growth, does not involve continuous growth of single nodes; further, the growth phase avoids the growth of microcracks in the simulation area and does not overlap the microcracks, and the sum of the porosities of the microcracks and the general pores is equal to the preset total porosity. The three-dimensional coordinates have 26 directions in total, including 6 main directions, 12 face opposite angle directions and 8 body opposite angle directions, the growth nucleus node is taken as the growth origin, and the skeleton regenerates random numbers to non-porous adjacent points in the 6 main directions. When the generated random number is smaller than the growth probability of growth nucleus, the point grows to be a growth phase node; and repeating this step until the growth phase meets the preset volume fraction.

It should be noted that the governing equation for heat conduction in the step S5 can be expressed as:

$$(\rho c_p)_f \left(\frac{\partial T}{\partial t}\right) = \lambda_f \nabla^2 T, (\rho c_p)_s \left(\frac{\partial T}{\partial t}\right) = \lambda_s \nabla^2 T$$

In the equation, the subscript f represents air in pores, s represents a solid skeleton, T represents a temperature of the material, and $\rho$, $\lambda$ and $c_p$ represent density, thermal conductivity coefficient and specific heat capacity at constant pressure, respectively.

Based on the above equation, a D3Q19 thermal Lattice Boltzmann model is adopted, and a temperature evolution equation is as follows:

$$g_\alpha(r + e_\alpha, t + \delta_t) - g_\alpha(r, t) = -\frac{1}{\tau}[g_\alpha(r,t) - g^{eq}(r,t)]$$

In the equation, r is a position vector, t is the time, $\delta_t$ is the time step, and $\alpha = 0, 1, \ldots, 18$ represent 19 discrete velocity directions, where $e_\alpha$ is a discrete velocity distribution equation:

$$e_\alpha = \begin{bmatrix} 0 & 1 & -1 & 0 & 0 & 0 & 0 & 1 & -1 & 1 & -1 & 1 & -1 & 1 & -1 & 0 & 0 & 0 & 0 \\ 0 & 0 & 0 & 1 & -1 & 0 & 0 & 1 & -1 & -1 & 1 & 0 & 0 & 0 & 0 & 1 & -1 & 1 & -1 \\ 0 & 0 & 0 & 0 & 0 & 1 & -1 & 0 & 0 & 0 & 0 & 1 & -1 & -1 & 1 & 1 & -1 & -1 & 1 \end{bmatrix}$$

$g^{eq}(r,t)$ represents an equilibrium distribution function of the temperature, as shown in the following equation:

$$g^{eq}(r, t) = \begin{cases} 1/3T & \alpha = 0 \\ 1/18T & \alpha = 1-7 \\ 1/36T & \alpha = 8-18 \end{cases}$$

The relationship between dimensionless relaxation time $\tau$ and thermal diffusivity $\lambda$ is:

$$\tau = 3\frac{\lambda}{\rho c_p} + 0.5$$

Both the grid interface and the gas-solid boundary conditions adopt a non-equilibrium extrapolation format:

$$g_\alpha(r+e_\alpha,t+\delta_t)=g_\alpha^{(eq)}(r+e_\alpha,t+\delta_t)-g_\alpha^{(ne)}(r+e_\alpha,t+\delta_t)= g_\alpha^{(eq)}(r+e_\alpha,t+\delta_t)+[g_\alpha(r,t)-g_\alpha^{eq}(r,t)]$$

The corresponding macroscopic temperature and heat flux can be determined by the following formula:

$$T = \sum_\alpha g_\alpha, \quad q = \left(\sum_\alpha e_\alpha g_\alpha\right)\frac{\tau - 0.5}{\tau}\rho c_p$$

after the temperature field is determined, the calculation formula of the effective thermal conductivity $\lambda_{eff}$ can be expressed as:

$$\lambda_{eff}=q\delta/\Delta T$$

in the formula, q is a steady-state heat flow through the coating with a thickness of $\delta t$, and $\Delta T$ represents a temperature differences between the upper and lower boundaries.

It should be noted that equal $(\rho c_p)$ values are selected during calculation, and a $(\rho c_p)$ value of air can be used as a reference value in the actual simulation; for the air in general solids and pores, it should be ensured that $(\tau_{gf}-0.5)/(\tau_{gs}-0.5)=\lambda_f/\lambda_s$, so as to reflect the difference between them in the heat-conducting property, and it is ensured that $\tau \in (0.5\sim2.0)$, so as to ensure the convergence of simulation in lattice units.

The present disclosure has the beneficial effects: the model of the present disclosure can restore a mesoscopic structure of the coating more truly and effectively, thereby cutting down the cost caused by scanning of a large amount of real coating samples, and predicting the heat insulation effect of the TBCs more accurately.

BRIEF DESCRIPTION OF THE DRAWINGS

FIGS. 3A-3D are schematic diagrams of a morphology of a single wedge-shaped lamellar microcrack at different angles according to the present disclosure, where

FIGS. 4A-4D are schematic diagrams of a model of a plurality of microcracks according to the present disclosure, where FIGS. 4A-4D illustrate morphologies of the microcracks under different statistical distribution law;

FIGS. 5A-5C are schematic structural diagrams of a general pore model of the TBCs according to present disclosure, where

FIGS. 7A-7B are schematic diagrams of a simulated coating temperature field distribution according to the present disclosure, where, with the same crack/pore ratio.

DETAILED DESCRIPTIONS OF THE EMBODIMENTS

The present disclosure will be further described below. It should be noted that the following embodiment is based on this technical solution and provide detailed implementation and specific operating procedures, but the protection scope of the present disclosure is not limited to this embodiments.

Embodiment

Figure 1:
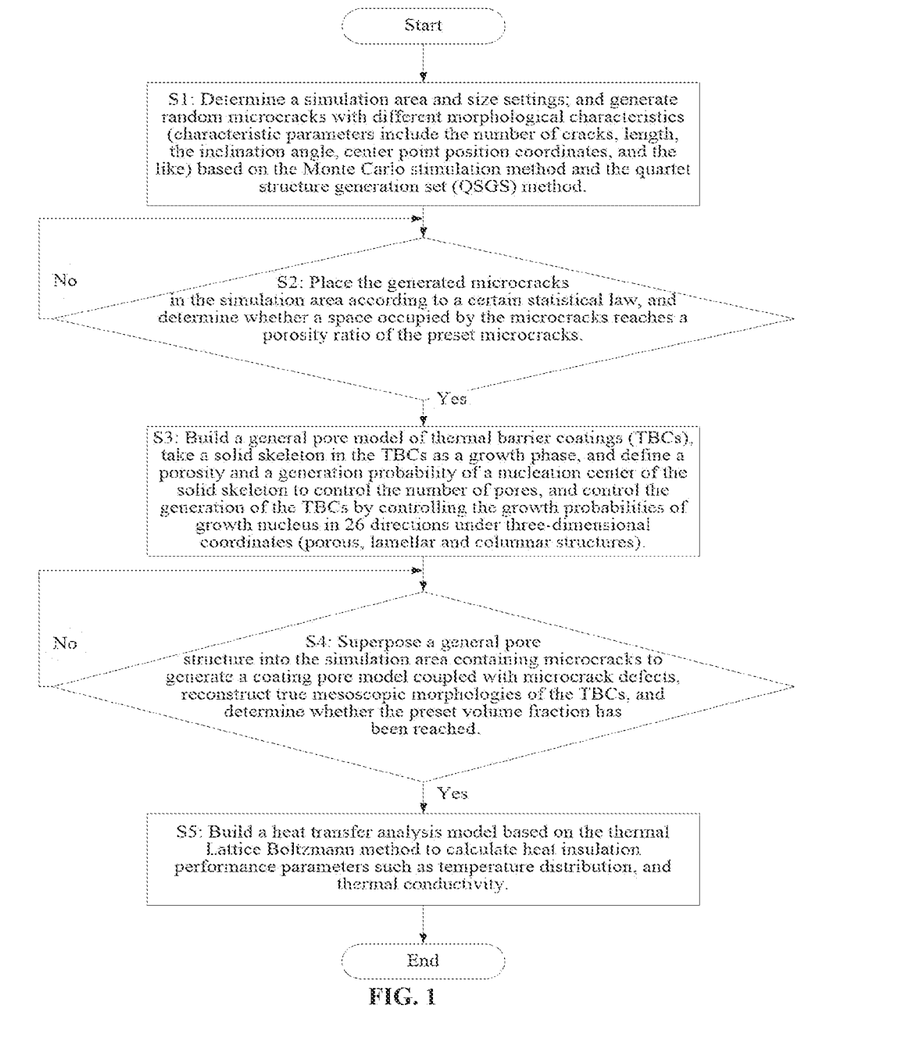
FIG. 1 is a schematic flowchart of the present disclosure.

As shown in FIG. 1, the present disclosure provides a method for numerical reconstruction and heat transfer characteristics evaluation of a microstructure of thermal hauler coatings containing microcracks, and the method has a low cost and can truly and effectively characterize both internal structural and morphological characteristics of the coatings, specifically including the following steps:

S1: determining a simulation area and size settings, mainly including settings of a physical model and a simulation calculation grid; and generating random microcracks with different morphological characteristics (characteristic parameters include the number of cracks, length, the inclination angle, center point position coordinates, and the like) based on the Monte Carlo simulation method and the quartet structure generation set (QSGS) method.

The Monte Carlo simulation method is adopted to generate a microcrack morphology (including the number of cracks, length, the inclination angle, center point position coordinates, and the like) under a certain statistical distribution law:

(1) Generating Random Numbers Uniformly Distributed Over an Interval of [0,1]:

an iterative formula of the linear congruential method for generating the random numbers is:

$$x_n(ax_{n-1}+c)(\mathrm{mod}\ M)$$

in the formula, a is a non-negative multiplier; c is a non-negative increment; M is a modulus; and (mod M) represents a remainder after being divided by m.

Random numbers R uniformly distributed over the interval of [0,1] are thus generated:

$$R_i = \frac{x_i}{M}$$

(2) Using Uniform Random Number Calculation to Generate Random Numbers with Other Specified Statistical Distribution Law:

the uniform random numbers over the interval of [0,1] generated in the (1) above are used to generate random numbers that obey other distribution types (such as uniform distribution, exponential distribution, normal distribution, and logarithmic normal distribution).

For example, the probability density function of a uniform distribution is:

$$f(x) = \frac{1}{b-a}(a \leq x \leq b)$$

A method for calculating random variables is as follows:

$$x_f = (b-a)R + a$$

in the formula, $x_f$ is random numbers required; and R represents random numbers uniformly distributed over the interval [0,1].

(3) Carrying Out Translation and Rotational Transformation of Coordinates to Realize Changes in the Orientation of Microcracks:

there are a base coordinate system 0 and a moving coordinate system I, their postures are the same, and their origins are not coincident. For any particle P in a space that is fixedly connected to the coordinate system I, its coordinates in the coordinate system 0 are expressed as $P_0 = [p_{0x}\ p_{0y}\ p_{0z}]^T$, and in the coordinate system I are expressed as $P_1 = [p_{1x}\ p_{1y}\ p_{1z}]^T$, and coordinates of the origin $O_1$ of the coordinate system I are $D_0^1 = [d_{0x}\ d_{0y}\ d_{0z}]^T$; there exists $P_0 = P_1 + D_0^1$ according to the rules for vector operations; when an attitude change matrix of the coordinate system I relative to the coordinate system 0 is taken into account, relative relationship between them can be considered as a combination of translational motion between the origins and pure rotation around the origins, there exists $P_0 = Rot_0^1 P_1 + D_0^1$; similarly $P_1 = Rot_1^0 P_0 + D_1^0$; where Rot represents basic rotation, which is written in a matrix in three-dimensional coordinates in the form of:

$$Rot_{x,\alpha} = \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix}$$

$$Rot_{y,\phi} = \begin{bmatrix} \cos\phi & 0 & \sin\phi & 0 \\ 0 & 1 & 0 & 0 \\ -\sin\phi & 0 & \cos\phi & 0 \\ 0 & 0 & 0 & 1 \end{bmatrix}$$

$$Rot_{z,\theta} = \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix}$$

The above formulae identify rotation by angles $\alpha$, $\phi$ and $\theta$ around x, y and z axes, respectively.

(4) Generating Microcracks.

Figure 2:
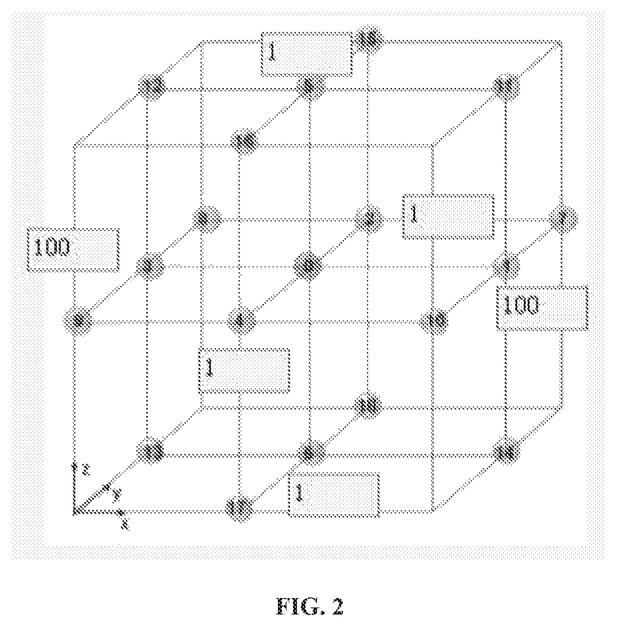
FIG. 2 shows the growth probabilities of a single microcrack in different directions according to the present disclosure.
Figure 3A:
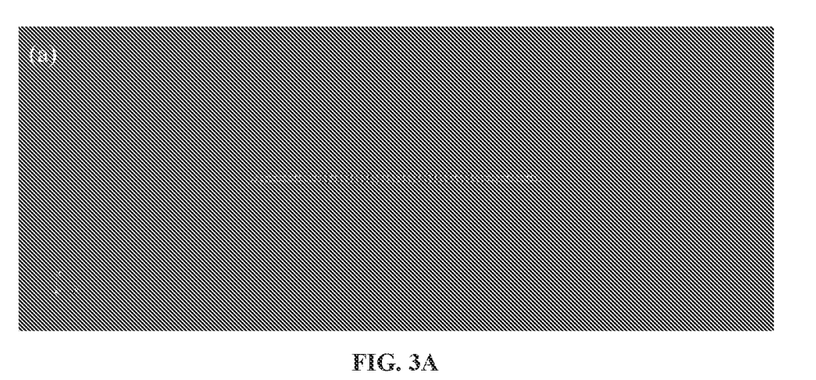
FIG. 3A is a section of an x-z axis.
Figure 3B:
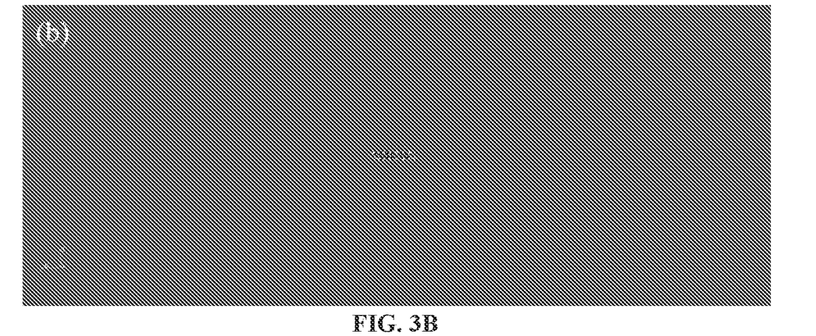
FIG. 3B is a section of a y-z axis.
Figure 3C:
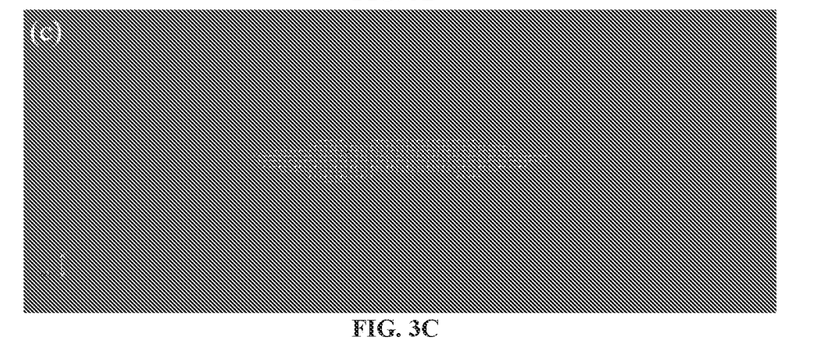
FIG. 3C is a section of an x-y axis.
Figure 3D:
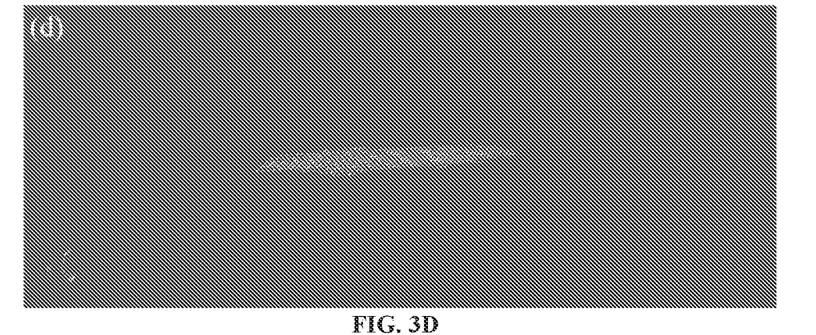
FIG. 3D is a three-dimensional front view.
Figure 4A:
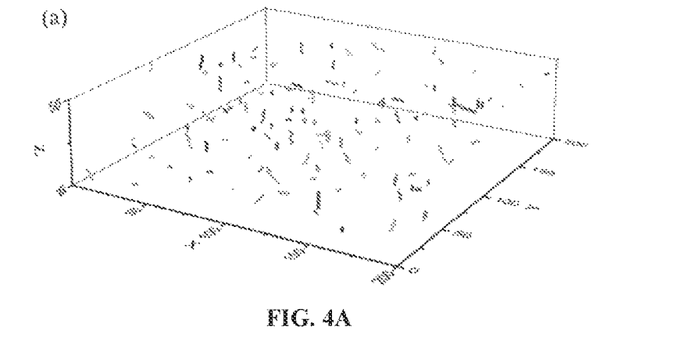
Figure 4B:
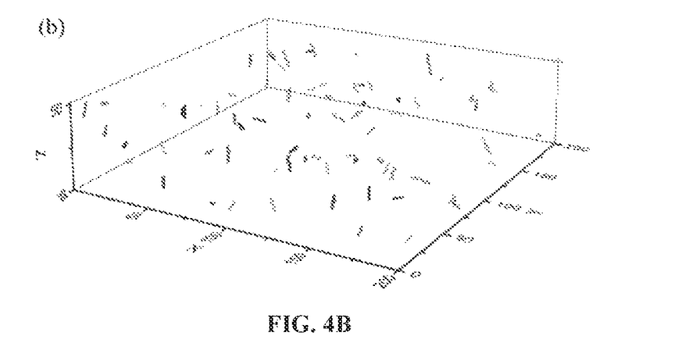
Figure 4C:
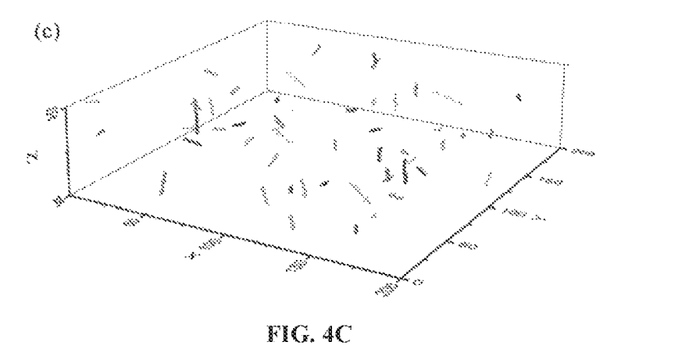
Figure 4D:
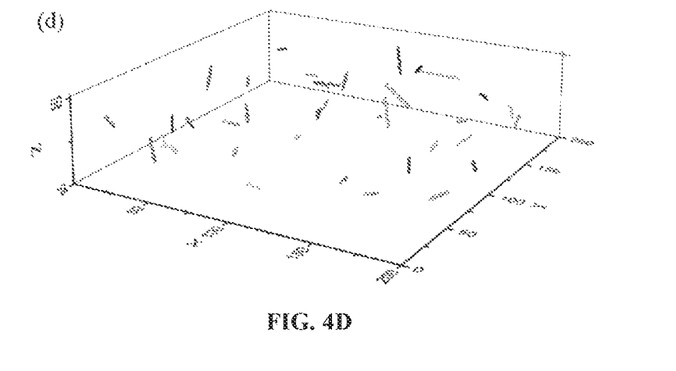

The QSGS method is adopted to generate a single microcrack and determine the morphology of the single microcrack:

the microcrack is generally wedge-shaped lamellar. As shown in FIG. 2, the microcrack can be ensured to be wedge-shaped by using the QSGS method to control the growth probability in the length/width direction to 100/1, and the structure of the wedge-shaped microcrack is shown in FIG. 3C; the thickness direction of the single microcrack is controlled only by two layers of grids, with a thickness of 2 μm, so as to ensure that the microcrack is approximately a lamellar structure, as shown in FIGS. 3A and 3B; and FIG. 3D is a three-dimensional front view of a generated single wedge-layer lamellar microcrack.

The Monte Carlo simulation method is further adopted to generate such morphology parameters as nucleation center point ($x_0$, $y_0$, $z_0$), inclination angle $\varphi$, inclination angle $\theta$, length, and the number according to a certain statistical distribution law. The nucleation center point ($x_0$, $y_0$, $z_0$) serves as a growth nucleation center of microcracks under QSGS method, the length of the microcracks controls the growth probabilities of the microcracks in different directions, and the inclination angle $\varphi$ and the inclination angle $\theta$ serve as bases for rotational transformation of coordinates, such that microcracks with different shapes, sizes, directions, and the like, distributed according to a certain statistical law are generated.

S2: changing the inclination directions of different microcracks by the coordinate transformation method according to a certain statistical law and placing them in the simulation area, FIGS. 4A-4D are schematic diagrams of a model of a plurality of microcracks in the present disclosure, and FIGS. 4A-4D illustrate morphologies of the microcracks under different statistical distribution law; and determining whether a space occupied by the microcracks reaches a porosity ratio of the preset microcracks.

Figure 5A:
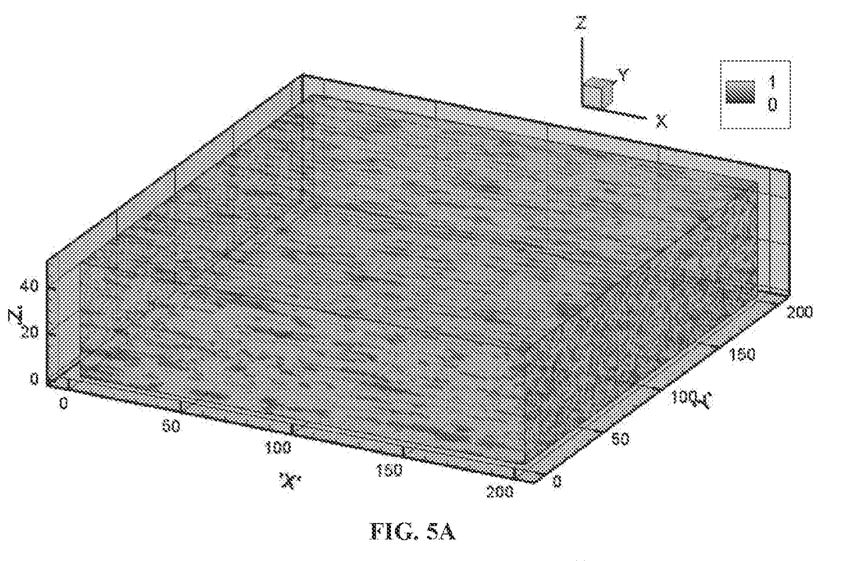
FIG. 5A shows a lamellar structure coating.
Figure 5B:
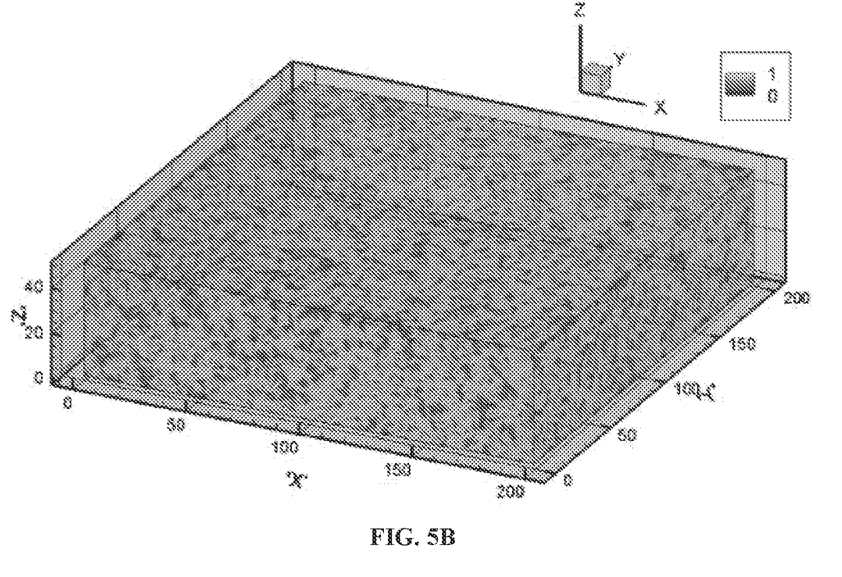
FIG. 5B shows a porous structure coating.
Figure 5C:
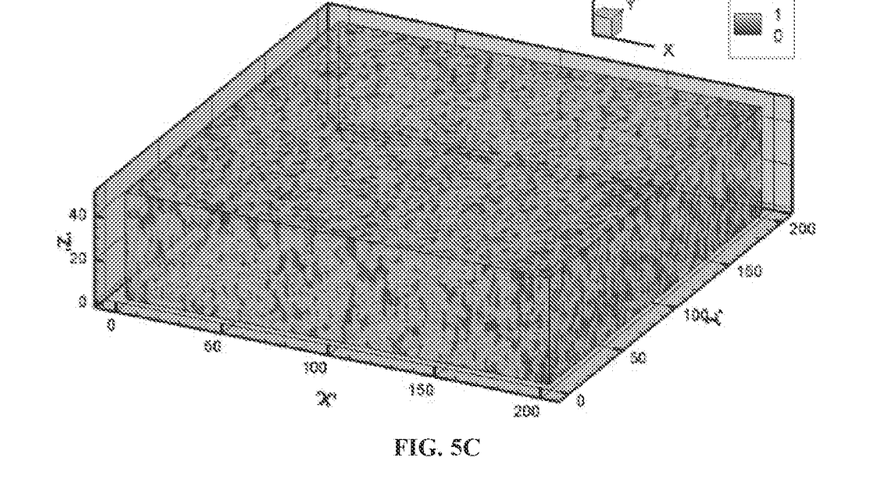
FIG. 5C shows a columnar structure coating.

S3: building a general pore model of thermal barrier coatings (TBCS) based on the QSGS method, where a solid skeleton in the TBCs is taken as a growth phase, pores are non-growth phases, settings of the porosity controls a pore volume fraction of the coating, and settings of the generation probability of a nucleation center of the solid skeleton controls the number of the pores; traversing the initially randomly distributed growth nucleus nodes, making each growth nucleus node randomly grow in a three-dimensional space, and controlling the generation of the TBCs with different structures (porous, lamellar and columnar structures) according to the growth probabilities of growth nucleus in 26 directions under three-dimensional coordinates, where the growth probability of the growth nucleus of the lamellar structure coating in the horizontal direction is far greater than that of the columnar structure coating, while the columnar structure coating is opposite, and FIGS. 5A-5C are schematic structural diagrams of a general pore model of the TBCs of the present disclosure, FIG. 5A shows a lamellar structure coating, FIG. 5B shows a porous structure coating, and FIG. 5C shows a columnar structure coating.

Figure 6:
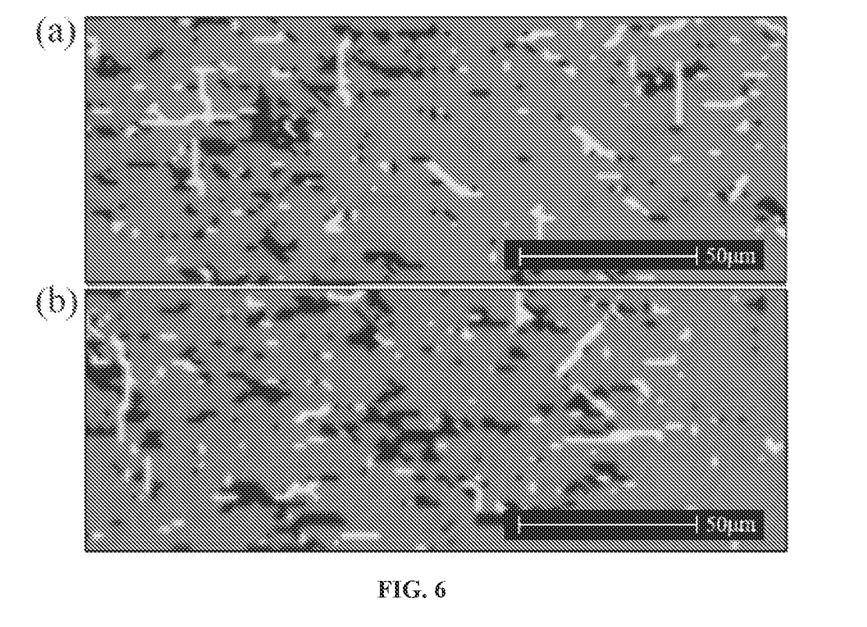
FIG. 6 is a schematic diagram of a y-z axis cross-section of a lamellar structure coating containing microcracks according to the present disclosure.

S4: superposing a general pore structure into the simulation area containing microcracks to generate a coating pore model coupled with microcrack defects, reconstructing true mesoscopic morphologies of the TBCs, and determining whether the preset volume fraction has been reached. FIG. 6 is a schematic diagram of a y-z axis cross-section of a lamellar structure coating containing microcracks of the present disclosure, it can be seen that the coating cross section has an apparent lamellar structure, with a large number of unbonded areas between the layers, and a large number of microcracks and spherical micropores within the layers, which is highly similar to the true morphologies of the TBCs. The algorithm in the step S3 is a circular traversal of the initial growth nucleus nodes and the growth nucleus nodes after growth, does not involve continuous growth of single nodes; further, the growth phase avoids the growth of microcracks in the simulation area and does not overlap the microcracks, and the sum of the porosities of the microcracks and the general pores is equal to the preset total porosity. The three-dimensional coordinates have 26 directions in total, including 6 main directions, 12 face opposite angle directions and 8 body opposite angle directions, the growth nucleus node is taken as the growth origin, and the skeleton regenerates random numbers to non-porous adjacent points in the 6 main directions. When the generated random number is smaller than the growth probability of growth nucleus, the point grows to be a growth phase node. Repeating this step until the growth phase meets the preset volume fraction.

S5: building a heat transfer analysis model based on the thermal Lattice Boltzmann method to calculate heat insulation performance parameters such as temperature distribution, and thermal conductivity. Compared with the prior art, the heat transfer analysis model can restore a mesoscopic structure of the coating more truly and effectively, thereby cutting down the cost caused by scanning of a large amount of real coating samples, and predicting the heat insulation effect of the TBCs more accurately.

The governing equation for heat conduction can be expressed as:

$$(\rho c_p)_f \left(\frac{\partial T}{\partial t}\right) = \lambda_f \nabla^2 T, \ (\rho c_p)_s \left(\frac{\partial T}{\partial t}\right) = \lambda_s \nabla^2 T$$

in the equation, the subscript f represents air in pores, s represents a solid skeleton, T represents a temperature of the material, and $\rho$, $\lambda$ and $c_p$ represent density, thermal conductivity coefficient and specific heat capacity at constant pressure, respectively.

Based on the above equation, a D3Q19 thermal Lattice Boltzmann model is adopted, and a temperature evolution equation is as follows:

$$g_\alpha(r+e_\alpha, t+\delta_t) - g_\alpha(r,t) = \frac{1}{\tau}[g_\alpha(r,t) - g^{eq}(r,t)]$$

in the equation, r is a position vector, t is the time, $\delta_t$ is the time step, and $\alpha=0, 1, \ldots, 18$ represent 19 discrete velocity directions, where $e_\alpha$ is a discrete velocity distribution equation:

$$e_\alpha = \begin{bmatrix} 0 & 1 & -1 & 0 & 0 & 0 & 0 & 1 & -1 & 1 & -1 & 1 & -1 & 1 & -1 & 0 & 0 & 0 & 0 \\ 0 & 0 & 0 & 1 & -1 & 0 & 0 & 1 & -1 & -1 & 1 & 0 & 0 & 0 & 0 & 1 & -1 & 1 & -1 \\ 0 & 0 & 0 & 0 & 0 & 1 & -1 & 0 & 0 & 0 & 0 & 1 & -1 & -1 & 1 & 1 & -1 & -1 & 1 \end{bmatrix}$$

$g^{eq}(r,t)$ represents an equilibrium distribution function of the temperature, as shown in the following equation:

$$g^{eq}(r,t) = \begin{cases} 1/3 T & \alpha = 0 \\ 1/18 T & \alpha = 1-7 \\ 1/36 T & \alpha = 8-18 \end{cases}$$

the relationship between dimensionless relaxation time $\tau$ and thermal diffusivity $\lambda$ is:

$$\tau = 3\frac{\lambda}{\rho c_p} + 0.5$$

generally, equal ($\rho c_p$) values are selected during calculation, and a ($\rho c_p$) value of air can be used as a reference value in the actual simulation; for the air in general solids and pores, it should be ensured that $(\tau_{gf}-0.5)/(\tau_{gs}-0.5)=\lambda_f/\lambda_s$, so as to reflect the difference between them in the heat-conducting property, and it is ensured that $\tau \in (0.5\sim2.0)$, so as to ensure the convergence of simulation in lattice units.

both the grid interface and the gas-solid boundary conditions adopt a non-equilibrium extrapolation format:

$$g_\alpha(r+e_\alpha,t+\delta_t)=g_\alpha^{(eq)}(r+e_\alpha,t+\delta_t)-g_\alpha^{(ne)}(r+e_\alpha,t+\delta_t)=\\g_\alpha^{(eq)}(r+e_\alpha,t+\delta_t)+[g_\alpha(r,t)-g_\alpha^{eq}(r,t)]$$

the corresponding macroscopic temperature and heat flux can be determined by the following formula:

$$T = \sum_\alpha g_\alpha, \ q = \left(\sum_\alpha e_\alpha g_\alpha\right)\frac{\tau - 0.5}{\tau}\rho c_p$$

after the temperature field is determined, the calculation formula of the effective thermal conductivity $\lambda_{eff}$ be expressed as:

$$\lambda_{eff} = q\delta/\Delta T$$

in the formula, q is a steady-state heat flow through the coating with a thickness of $\delta t$, and $\Delta T$ represents a temperature differences between the upper and lower boundaries.

Figure 7A:
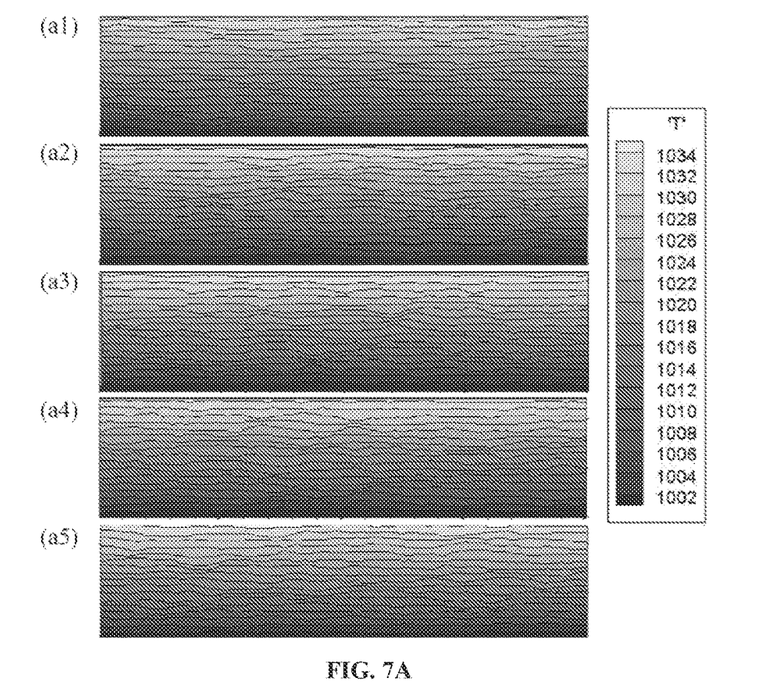
FIG. 7A represents a temperature field of a lamellar structure coating with (a1) or without (a2-a5) microcracks of different sizes, and 7B represents a temperature field of a columnar structure coating with (b1) or without (b2-b5) microcracks of different sizes.
Figure 7B:
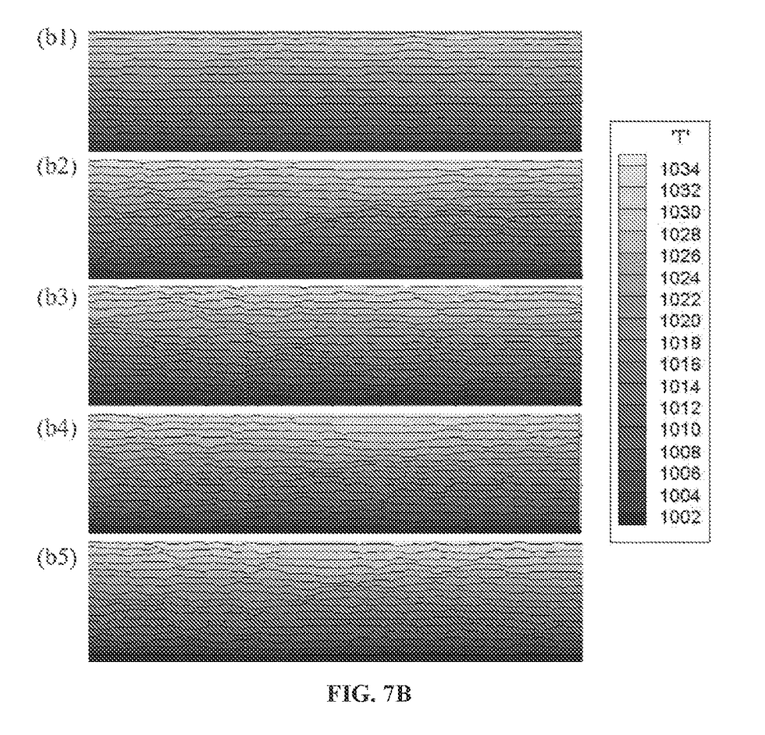

FIGS. 7A-7B are schematic diagrams of a simulated coating temperature field distribution of the present disclosure. With the same crack/pore ratio, FIG. 7A represents a temperature field of a lamellar structure coating with (a1) or without (a2-a5) microcracks of different sizes. FIG. 7B represents a temperature field of a columnar structure coating with (b1) or without (b2-b5) microcracks of different sizes.

Figure 8:
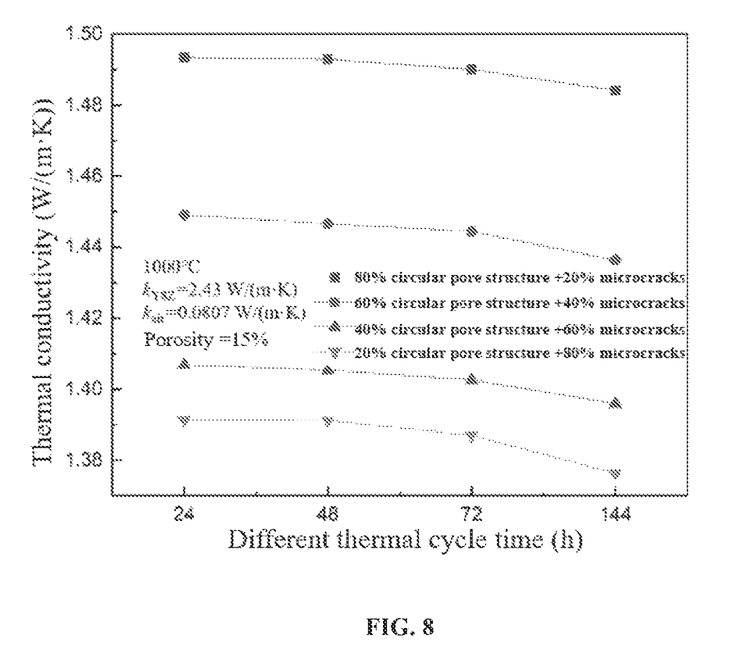
FIG. 8 is a diagram of comparison between numerical simulation results and the literature in terms of the effective thermal conductivity of a coating changing with microcrack parameters according to the present disclosure.

FIG. 8 shows numerical simulation results of the effective thermal conductivity of a coating changing with microcrack parameters of the present disclosure. As can be seen from the figure, the thermal conductivity gradually decreases as the crack ratio increases. Therefore, the numerical reconstruction model of the TBCs built by the present disclosure can play a certain guiding role in preparing and using the TBCs, and can reflect the evolution law of the thermal insulation performance of the TBCs.

Those skilled in the art can make various modifications and variations of the present disclosure based on the above technical solutions and concepts, and all these modifications and variations should be included in the protection scope of the claims of the present disclosure.

What is claimed is:

1. A method for numerical reconstruction and heat transfer characteristics evaluation of a microstructure of thermal barrier coatings (TBCs) containing microcracks before application of TBCs on surface of an object, comprising:

S1: determining a simulation area and size settings, comprising settings of a physical model and a simulation calculation grid; and generating random microcracks with different morphological characteristics based on a Monte Carlo simulation method and a quartet structure generation set (QSGS) method;

S2: changing inclination directions of different microcracks by a coordinate transformation method according to a certain statistical law and placing them in the simulation area, and determining whether a space occupied by the microcracks reaches a porosity ratio of preset microcracks;

S3: building a general pore model of thermal barrier coatings (TBCs) based on the QSGS method, wherein a solid skeleton in the TBCs is taken as a growth phase, pores are non-growth phases, settings of the porosity controls a pore volume fraction of the coating, and settings of a generation probability of a nucleation center of the solid skeleton controls a number of the pores; traversing the initially randomly distributed growth nucleus nodes, making each growth nucleus node randomly grow in a three-dimensional space, controlling the generation of the TBCs with different structures according to the growth probabilities of growth nucleus in 26 directions under three-dimensional coordinates, wherein the growth probability of the growth nucleus of a lamellar structure coating in a horizontal direction is far greater than that of the columnar structure coating, and the columnar structure coating is opposite;

S4: superposing a general pore structure into the simulation area containing microcracks to generate a coating pore model coupled with microcrack defects, reconstructing true mesoscopic morphologies of the TBCs, and determining whether the preset volume fraction has been reached;

S5: building a heat transfer analysis model based on a thermal Lattice Boltzmann method to calculate heat insulation performance parameters such as temperature distribution, and thermal conductivity, and using the Monte Carlo simulation method in the step S1 to generate a microcrack morphology under a certain statistical distribution law:

S1.1 generating random numbers uniformly distributed over an interval of [0,1]:

an iterative formula of a linear congruential method for generating the random numbers is:

$$x_n = (ax_{n-1} + c)(\text{mod } M) \quad (1)$$

in the formula, $x_n$ is a current pseudo random number, $x_{n-1}$ is a previous pseudo random number, a is a non-negative multiplier; c is a non-negative increment; M is a modulus; and (mod M) represents a remainder after being divided by m;

random numbers R uniformly distributed over the interval of [0,1] are thus generated:

$$R_i = \frac{x_i}{M}$$

S1.2 using uniform random number calculation to generate random numbers with other specified statistical distribution law:

the uniform random numbers over the interval of [0,1] generated in the (1) above are used to generate random numbers that obey other distribution types;

the probability density function of a uniform distribution is:

$$f(x) = \frac{1}{b-a} (a \le x \le b)$$

wherein a and b represent end points of an interval, a method for calculating random variables is as follows:

$$x_f = (b-a)R + a$$

in the formula, $x_f$ is random numbers required; and R represents random numbers uniformly distributed over the interval [0,1];

S1.3 carrying out translation and rotational transformation of coordinates to realize changes in the orientation of microcracks:

there are a base coordinate system 0 and a moving coordinate system I, their postures are the same, and their origins are not coincident; for any particle P in a space that is fixedly connected to the coordinate system I, its coordinates in the coordinate system 0 are expressed as $P_0 = [p_{0x}\ p_{0y}\ p_{0z}]^T$, and in the coordinate system I are expressed as $P_1 = [p_{1x}\ p_{1y}\ p_{1z}]^T$, and coordinates of the origin $O_1$ of the coordinate system I are $D_0^1 = [d_{0x}\ d_{0y}\ d_{0z}]^T$; there exists $P_0 = P_1 + D_0^1$ according to the rules for vector operations; when an attitude change matrix of the coordinate system I relative to the coordinate system 0 is taken into account, relative relationship between them is considered as a combination of translational motion between the origins and pure rotation around the origins, there exists $P_0 = Rot_0^1 P_1 + D_0^1$; similarly $P_1 = Rot_1^0 P_0 + D_1^0$; wherein Rot represents basic rotation, which is written in a matrix in three-dimensional coordinates in the form of:

$$Rot_{x,\alpha} = \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix}$$

$$Rot_{y,\phi} = \begin{bmatrix} \cos\phi & 0 & \sin\phi & 0 \\ 0 & 1 & 0 & 0 \\ -\sin\phi & 0 & \cos\phi & 0 \\ 0 & 0 & 0 & 1 \end{bmatrix}$$

$$Rot_{z,\theta} = \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix}$$

the above formulae identify rotation by angles $\alpha$, $\phi$ and $\theta$ around x, y and z axes, respectively; and S1.4 generating microcracks, and using the QSGS method to control the growth probability ratio in between the length and width direction to 100 to 1 to ensure that the microcracks are wedge-shaped; controlling the thickness direction of a single microcrack to be two layers of grids, so as to ensure that the microcrack is approximately a lamellar structure; and using the Monte Carlo simulation method to generate such morphology parameters as nucleation center point $(x_0, y_0, z_0)$, inclination angle $\varphi$, inclination angle $\theta$, length, and the number according to a certain statistical distribution law, wherein the nucleation center point (x0, y0, z0) serves as a growth nucleation center of microcracks under QSGS method, the length of the microcracks controls the growth probabilities of the microcracks in different directions, and the inclination angle $\varphi$ and the inclination angle $\theta$ serve as bases for rotational transformation of coordinates, such that microcracks with different shapes, sizes, directions, and the like, distributed according to a certain statistical law are generated, and the algorithm in the step S3 is a circular traversal of the initial growth nucleus nodes and the growth nucleus nodes after growth; further, the growth phase avoids the growth of microcracks in the simulation area and does not overlap the microcracks, and the sum of the porosities of the microcracks and the general pores is equal to the preset total porosity; the three-dimensional coordinates have 26 directions in total, comprising 6 main directions, 12 face opposite angle directions and 8 body opposite angle directions, the growth nucleus node is taken as the growth origin, and the skeleton regenerates random numbers to non-porous adjacent points in the 6 main directions; when the generated random number is smaller than the growth probability of growth nucleus, the point grows to be a growth phase node; and repeating this step until the growth phase meets the preset volume fraction;

S1.5 preparing TBCs based on the results of the numerical reconstruction and heat transfer characteristics evaluation.

2. The method for numerical reconstruction and heat transfer characteristics evaluation of the microstructure of thermal barrier coatings containing microcracks according to claim 1, wherein the governing equation for heat conduction in the step S5 is expressed as:

$$(\rho c_p)_f \left(\frac{\partial T}{\partial t}\right) = \lambda_f \nabla^2 T, \ (\rho c_p)_s \left(\frac{\partial T}{\partial t}\right) = \lambda_s \nabla^2 T$$

in the equation, the subscript f represents air in pores, s represents a solid skeleton, T represents a temperature of the material, and $\rho$, $\lambda$ and $c_p$ represent density, thermal conductivity coefficient and specific heat capacity at constant pressure, respectively;

based on the above equation, a thermal Lattice Boltzmann model is adopted, and a temperature evolution equation is as follows:

$$g_\alpha(r + e_\alpha, t + \delta_t) - g_\alpha(r, t) = -\frac{1}{\tau}[g_\alpha(r, t) - g^{eq}(r, t)]$$

in the equation, r is a position vector, t is the time, $\delta_t$ is the time step, and $\alpha=0, 1, \ldots, 18$ represent 19 discrete velocity directions, wherein $e_\alpha$ is a discrete velocity distribution equation:

$$e_\alpha = \begin{bmatrix} 0 & 1 & -1 & 0 & 0 & 0 & 0 & 1 & -1 & 1 & -1 & 1 & -1 & 1 & -1 & 0 & 0 & 0 & 0 \\ 0 & 0 & 0 & 1 & -1 & 0 & 0 & 1 & -1 & -1 & 1 & 0 & 0 & 0 & 0 & 1 & -1 & 1 & -1 \\ 0 & 0 & 0 & 0 & 0 & 1 & -1 & 0 & 0 & 0 & 0 & 1 & -1 & -1 & 1 & 1 & -1 & -1 & 1 \end{bmatrix}$$

$g^{eq}(r,t)$ represents an equilibrium distribution function of the temperature, as shown in the following equation:

$$g^{eq}(r, t) = \begin{cases} 1/3T & \alpha = 0 \\ 1/18T & \alpha = 1 - 7 \\ 1/36T & \alpha = 8 - 18 \end{cases}$$

the relationship between dimensionless relaxation time $\tau$ and thermal diffusivity $\lambda$ is:

$$\tau = 3\frac{\lambda}{\rho c_p} + 0.5$$

both the grid interface and the gas-solid boundary conditions adopt a non-equilibrium extrapolation format:

$g_\alpha(r+e_\alpha,t+\delta_t)=g_\alpha^{(eq)}(r+e_\alpha,t+\delta_t)-g_\alpha^{(ne)}(r+e_\alpha,t+\delta_t)= g_\alpha^{(eq)}(r+e_\alpha,t+\delta_t)+[g_\alpha(r,t)-g_\alpha^{eq}(r,t)]$ the corresponding macroscopic temperature and heat flux is determined by the following formula:

$$\tau = 3\frac{\lambda}{\rho c_p} + 0.5$$

after the temperature field is determined, the calculation formula of the effective thermal conductivity $\lambda_{eff}$ is expressed as:

$\lambda_{eff} = q\delta/\Delta T$ in the formula, q is a steady-state heat flow through the coating with a thickness of $\delta t$, and $\Delta T$ represents a temperature difference between the upper and lower boundaries.

3. The method for numerical reconstruction and heat transfer characteristics evaluation of the microstructure of thermal barrier coatings containing microcracks according to claim 2, wherein equal $(\rho c_p)$ values are selected during calculation, and a $(\rho c_p)$ value of air is used as a reference value in the actual simulation; for the air in general solids and pores, it should be ensured that $(\tau_{gf}-0.5)/(\tau_{gs}-0.5)=\lambda_f/\lambda_s$, so as to reflect the difference between them in the heat-conducting property, and it is ensured that $\tau \in (0.5\text{-}2.0)$, so as to ensure the convergence of simulation in lattice units.

* * * * *